United States Patent
Liao et al.

(10) Patent No.: US 10,755,572 B2
(45) Date of Patent: Aug. 25, 2020

(54) URBAN PRIVATE PARKING SPACE SHARING AND EXCHANGING SERVICE METHOD AND SYSTEM

(71) Applicant: FUJIAN UNIVERSITY OF TECHNOLOGY, Fuzhou, Fujian (CN)

(72) Inventors: Lvchao Liao, Fujian (CN); Fumin Zou, Fujian (CN); Xinhua Jiang, Fujian (CN); Hongtu Lai, Fujian (CN); Yun Chen, Fujian (CN); Weidong Fang, Fujian (CN); Shijian Liu, Fujian (CN); Jiying Xiao, Fujian (CN); Xianghai Ge, Fujian (CN); Meirun Zhang, Fujian (CN)

(73) Assignee: FUJIAN UNIVERSITY OF TECHNOLOGY, Fuzhou (CN)

( * ) Notice: Subject to any disclaimer, the term of this patent is extended or adjusted under 35 U.S.C. 154(b) by 0 days.

(21) Appl. No.: 16/348,148

(22) PCT Filed: Apr. 18, 2017

(86) PCT No.: PCT/CN2017/080875
§ 371 (c)(1),
(2) Date: May 8, 2019

(87) PCT Pub. No.: WO2018/086310
PCT Pub. Date: May 17, 2018

(65) Prior Publication Data
US 2019/0347935 A1 Nov. 14, 2019

(30) Foreign Application Priority Data
Nov. 10, 2016 (CN) .......................... 2016 1 0989322

(51) Int. Cl.
*B60Q 1/48* (2006.01)
*G09B 1/14* (2006.01)
(Continued)

(52) U.S. Cl.
CPC ............. *G08G 1/149* (2013.01); *G06Q 10/02* (2013.01); *G08G 1/147* (2013.01); *G08G 1/148* (2013.01); *G06Q 2240/00* (2013.01)

(58) Field of Classification Search
CPC ........ G08G 1/149; G08G 1/148; G08G 1/147; G08G 1/146; G08G 1/144; G06Q 10/02; G06Q 2240/00; H04W 4/02
(Continued)

(56) References Cited

FOREIGN PATENT DOCUMENTS

CN 104077717 A * 10/2014
CN 104077717 A 10/2014
(Continued)

OTHER PUBLICATIONS

International search report of PCT Patent Application No. PCT/CN2017/080875 dated Jun. 5, 2017.

*Primary Examiner* — Tanmay K Shah

(57) ABSTRACT

The invention relates to the field of information sharing, in particular to an urban private parking space sharing and exchanging service method and system. A parking space supply side sets parking space sharing information and releases the parking space sharing information on a sharing platform, and then an intelligent parking space lock is triggered to conduct locking; a parking space demand side acquires the parking space sharing information within a preset range, so that a parking space sharing information set is formed; the parking space demand side selects a parking space corresponding to the parking space sharing information from the parking space sharing information set and sets a time to leave the parking space. Urban private parking space information is shared, and the utilization rate of parking spaces is increased.

8 Claims, 1 Drawing Sheet

(51) Int. Cl.
*G08G 1/14* (2006.01)
*G06Q 10/02* (2012.01)
(58) Field of Classification Search
USPC ..................................................... 340/932.2
See application file for complete search history.

(56) References Cited

FOREIGN PATENT DOCUMENTS

| CN | 105064752 A | 11/2015 |
|---|---|---|
| CN | 105489057 A | 4/2016 |
| CN | 105701868 A | 6/2016 |

\* cited by examiner

URBAN PRIVATE PARKING SPACE SHARING AND EXCHANGING SERVICE METHOD AND SYSTEM

TECHNICAL FIELD

The invention relates to the field of information sharing, in particular to an urban private parking space sharing and exchanging service method and system.

DESCRIPTION OF RELATED ART

The vigorous development of the domestic automobile industry leads to rapid increase of the motor vehicle population, and severe parking problems have occurred in many cities. Due to the increasing shortage of land resources in cities, there has been no extra land to construct more parking lots or parking spaces, and in this situation, it is necessary to more reasonably and sufficiently use existing parking spaces by means of the advanced information technology, location technology or other technologies. In addition, most private parking spaces are vacant in working hours while there are usually many parking demands nearby, and therefore, the limited and scarce parking spaces are not sufficiently and reasonably used.

At present, information about vacant parking spaces in a parking lot of a residential community is generally released by security personnel in this community, but is not open to the public and cannot be acquired by other users. The difficulty in urban private parking space information sharing and exchanging leads to a high vacancy rate and low utilization rate of the parking spaces.

Technical Issue

The technical issue to be settled by the invention is to provide an urban private parking space sharing and exchanging service method and system to realize information sharing of urban private parking spaces and to increase the utilization rate of the parking spaces.

Solution to the Technical Issue

Technical Solution

The technical solution adopted by the invention to settle the above technical issue is as follows:

The invention provides an urban private parking space sharing and exchanging service method comprising the following steps:

Setting parking space sharing information and releasing the parking space sharing information on a sharing platform by a parking space supply side, and triggering an intelligent parking space lock to conduct locking, wherein the parking space sharing information includes the location and sharing period of a parking space;

Acquiring the parking space sharing information within a preset range by a parking space demand side, so that a parking space sharing information set is formed;

Selecting a parking space corresponding to the parking space sharing information from the parking space sharing information set and setting a time to leave the parking space, by the parking space demand side; and Triggering the intelligent parking space lock to conduct unlocking if the time set by the parking space demand side to leave the parking space is within the sharing period.

The invention further provides an urban private parking space sharing and exchanging service system comprising:

A first release module used for setting parking space sharing information and releasing the parking space sharing information on a sharing platform by a parking space supply side and for triggering an intelligent parking space lock to conduct locking, wherein the parking space sharing information includes the location and sharing period of a parking space;

A first acquisition module used for acquiring the parking space sharing information within a preset range by a parking space demand side, so as to form a parking space sharing information set;

A setting module used for selecting a parking space corresponding to the parking space sharing information from the parking space sharing information set and setting a time to leave the parking space, by the parking space demand side; and A trigger module used for triggering the intelligent parking space lock to conduct unlocking if the time set by the parking space demand side to leave the parking space is within the sharing period.

Beneficial Effects of the Invention

Beneficial Effects

The invention has the following beneficial effects: the parking space supply side sets parking space sharing information and then releases the parking space sharing information on the sharing platform, so that the parking space demand side can acquire the parking space sharing information within a preset range from the sharing platform (namely, information about vacant parking spaces near the parking space demand side), and therefore, the utilization rate of the vacant parking spaces is increased. In addition, after releasing the parking space sharing information, the parking space supply side triggers the intelligent parking space lock to conduct locking, only if it is determined by the sharing platform that the time set by the parking space demand side to leave the parking space is not later than the end time of the parking space sharing period, the intelligent parking space lock will be triggered to conduct unlocking to allow the parking space demand side to use the parking space, in this way, only qualified parking space demand sides can use vacant parking spaces, so that the vacuum parking spaces are prevented from being abused, and the rights and interests of parking space owners are guaranteed.

BRIEF DESCRIPTION OF THE DRAWINGS

Brief Description of the Several Views of the Drawings

Figure 1:
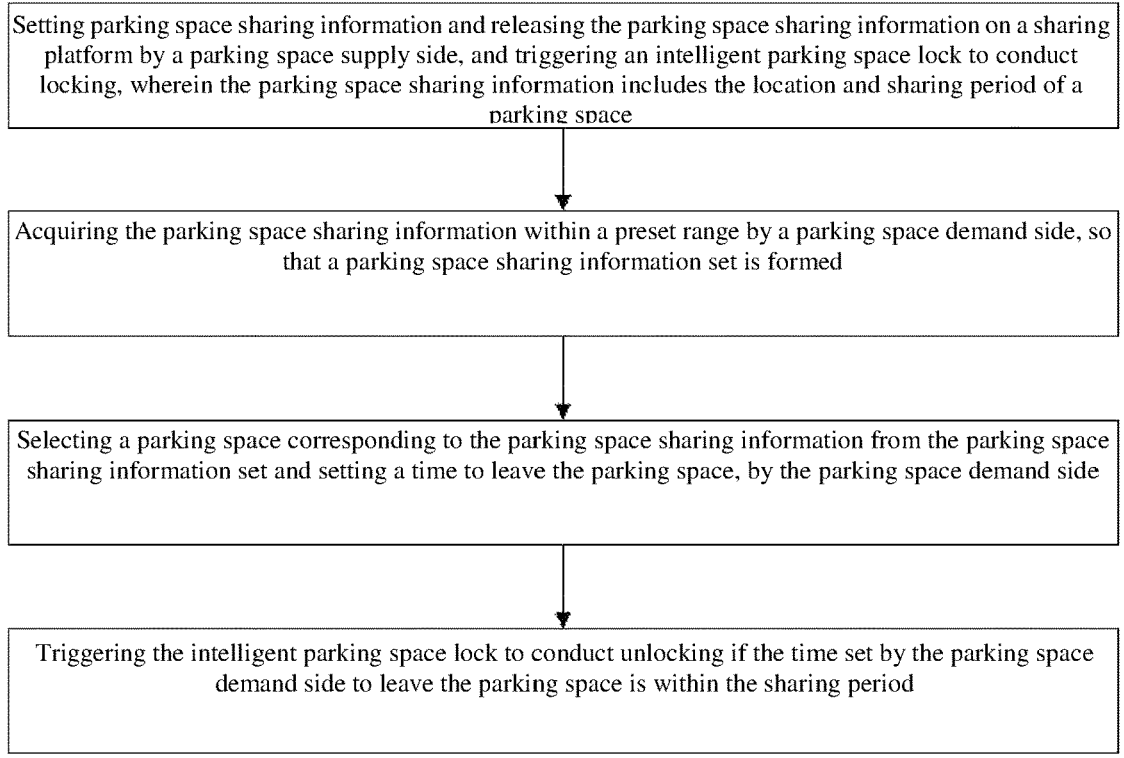
Figure 2:
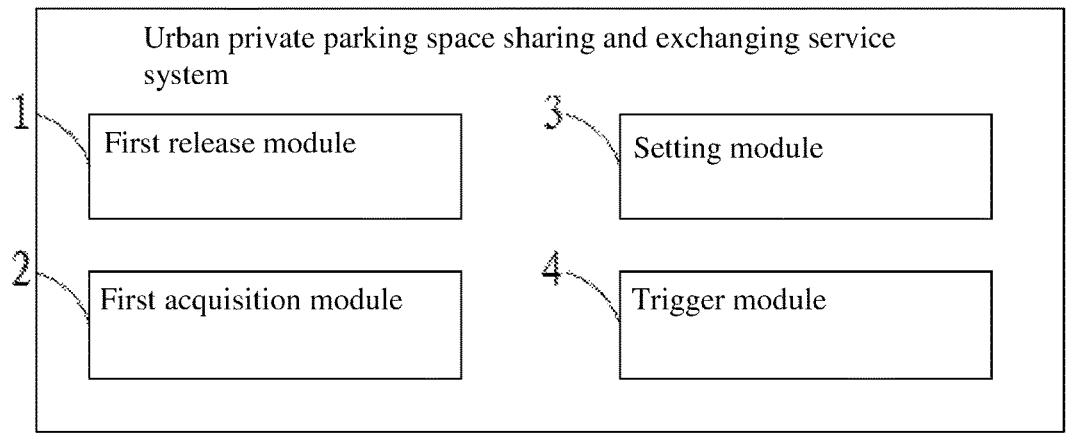
Figure 3:
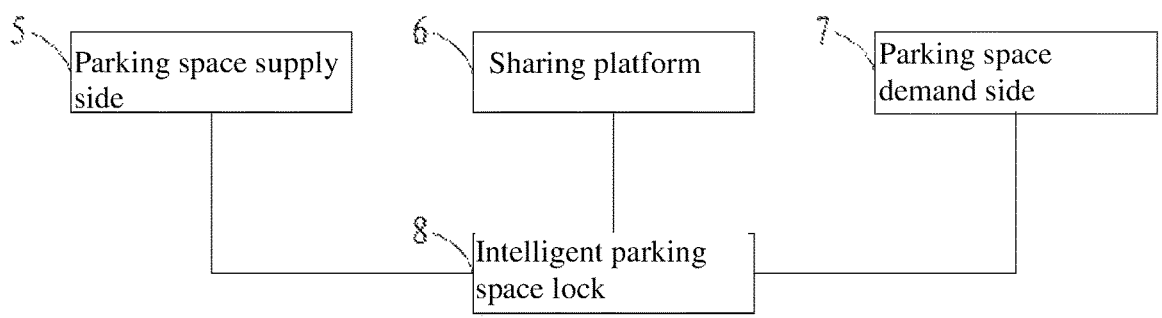

FIG. 1 is a flow block diagram of an urban private parking space sharing and exchanging service method of the invention;

FIG. 2 is a structure diagram of an urban private parking space sharing and exchanging service system of the invention;

FIG. 3 is another structure diagram of the urban private parking space sharing and exchanging service system of the invention;

REFERENCE SIGNS

1, first release module; 2, first acquisition module; 3, setting module; 4, trigger module; 5, parking space supply side; 6, sharing platform; 7, parking space demand side; 8, intelligent parking space lock.

SPECIFIC EMBODIMENTS OF THE INVENTION

Detailed Description of the Invention

The key conception of the invention lies in that a parking space supply side sets parking space sharing information and then releases the parking space sharing information on a sharing platform, so that a parking space demand side can acquire the parking space sharing information within a preset range from the sharing platform, and therefore, urban private parking space information is shared and exchanged.

As shown in FIG. 1, the invention provides an urban private parking space sharing and exchanging service method comprising the following steps:

Setting parking space sharing information and releasing the parking space sharing information on a sharing platform by a parking space supply side, and triggering an intelligent parking space lock to conduct locking, wherein the parking space sharing information includes the location and sharing period of a parking space;

Acquiring the parking space sharing information within a preset range by a parking space demand side, so that a parking space sharing information set is formed;

Selecting a parking space corresponding to the parking space sharing information from the parking space sharing information set and setting a time to leave the parking space, by the parking space demand side; and Triggering the intelligent parking space lock to conduct unlocking if the time set by the parking space demand side to leave the parking space is within the sharing period.

Furthermore, the urban private parking space sharing and exchanging service method further comprises the following steps:

If a time interval from the time to leave to the parking space to an end time of the sharing period is greater than a preset minimum time interval, Acquiring a current system time of the sharing platform;

Updating, when the current system time is identical with the time to leave the parking space, the sharing period in the parking space sharing information according to the current system time, so that latest parking space sharing information is obtained; and Releasing the latest parking space sharing information on the sharing platform.

The sharing platform automatically determines the time interval from the current system time to the end time of the sharing period; if the time interval is long, the sharing platform modifies the sharing period of the parking space and then automatically releases the latest sharing information of the parking space, so that the utilization rate of the parking space is further increased.

Furthermore, the urban private parking space sharing and exchanging service method further comprises the following steps:

Scanning, by the parking space supply side, an identification code of the intelligent parking space lock, so that an account of the parking space supply side and an account of a parking space owner stored in the intelligent parking space lock are acquired; and Obtaining, by the parking space supply side, a permission to set and release parking space sharing information if the account of the parking space supply side is identical with the account of the parking space owner stored in the intelligent parking space lock.

From the above description, only if the identity of the parking space supply side is verified as valid, the parking space supply side can obtain the permission to set and release relevant sharing information, so that the private parking space is shared completely based on the willingness of the parking space owner, and the rights and interests of the parking space owner are guaranteed.

Furthermore, the urban private parking space sharing and exchanging service method further comprises the following steps:

Scanning, by the parking space demand side, the identification code of the intelligent parking space lock; and Acquiring, by the parking space demand side, a permission to set a time to leave the parking space.

From the above description, only if the identity of the parking space demand side is identified as valid, the parking space demand side can obtain the permission to set the time to leave the parking space and can have a change to use the parking space, wherein the identity of the parking space demand side is verified in multiple aspects, for instance, whether or not the parking space demand side is a valid user of the sharing platform is verified, and the credibility of the parking space demand side is also verified, so that the rights and interests of the parking space owner are guaranteed.

Furthermore, the urban private parking space sharing and exchanging service method further comprises the following steps:

If an account of the parking space demand side is mismatched with a preset associated account or the account of the parking space supply side, Acquiring a time when the intelligent parking space lock is triggered to conduct unlocking, so that a parking start time is obtained;

Acquiring the current system time of the sharing platform, so that a parking end time is obtained;

Obtaining a parking fee by calculation according to the parking start time and the parking end time; and Automatically deducting, by the sharing platform, the parking fee from the account of the parking space demand side, and triggering to the intelligent parking space lock to conduct locking.

From the above description, the parking fee is automatically deducted from the account of the parking space demand side, and when the parking space demand side leaves the parking space, the intelligent parking space lock is triggered to conduct locking, so that the parking space is prevented from being abused. In addition, by setting the associated account, the parking space owner and a parking space demand side permitted by the parking space owner are free of charge for the parking fee.

Furthermore, the urban private parking space sharing and exchanging service method further comprises the following step:

Establishing communication between the intelligent parking space lock and the parking space supply side as well as communication between the intelligent parking space lock and the parking space demand side via Bluetooth or NFC.

From the above description, the intelligent parking space lock is in communication with the parking space supply side and the parking space demand side.

As shown in FIG. 2 and FIG. 3, the invention further provides an urban private parking space sharing and exchanging service system comprising:

A first release module 1 used for setting parking space sharing information and releasing the parking space sharing information on a sharing platform 6 by a parking space supply side 5 and for triggering an intelligent parking space lock 8 to conduct locking, wherein the parking space sharing information includes the location and sharing period of a parking space;

A first acquisition module 2 used for acquiring the parking space sharing information within a preset range by a parking space demand side 7, so as to form a parking space sharing information set;

A setting module 3 used for selecting a parking space corresponding to the parking space sharing information from the parking space sharing information set and setting a time to leave the parking space, by the parking space demand side 7; and A trigger module 4 used for triggering the intelligent parking space lock 8 to conduct unlocking if the time set by the parking space demand side 7 to leave the parking space is within the sharing period.

Furthermore, the urban private parking space sharing and exchanging service system further comprises:

A first determination module used for determining whether or not a time interval from the time to leave the parking space and an end time of the sharing period is greater than a preset minimum time interval;

A second acquisition module used for acquiring a current system time of the sharing platform 6;

An updating module used for updating, when the current system time is identical with the time to leave the parking space, the sharing period in the parking space sharing information according to the current system time, so that latest parking space sharing information is obtained; and A second release module used for releasing the latest parking space sharing information on the sharing platform 6.

Furthermore, the urban private parking space sharing and exchanging service system further comprises:

A third acquisition module used for scanning, by the parking space supply side 5, an identification code of the intelligent parking space lock 8, so as to acquire an account of the parking space supply side 5 and an account of a parking space owner stored in the intelligent parking space lock 8;

A fourth acquisition module used for acquiring, by the parking space supply side 5, a permission to set and release the parking space sharing information if the account of the parking space supply side 5 is identical with the account of the parking space owner stored in the intelligent parking space lock 8;

A scanning module used for scanning, by the parking space demand side 7, the identification code of the intelligent parking space lock 8;

A fifth acquisition module used for acquiring, by the parking space demand side 7, a permission to set the time to leave the parking space; and A communication module used for establishing communication between the intelligent parking space lock 8 and the parking space supply side 5 as well as communication between the intelligent parking space lock 8 and the parking space demand side 7 via Bluetooth or NFC.

Furthermore, the urban private parking space sharing and exchanging service system further comprises:

A second determination module used for determining whether or not an account of the parking space demand side 7 is matched with a preset associated account or the account of the parking space supply side 5;

A sixth acquisition module used for acquiring a time when the intelligent parking space lock 8 is triggered to conduct unlocking, so as to obtain a parking start time;

A seventh acquisition module used for acquiring the current system time of the sharing platform 9, so as to obtain a parking end time;

A calculation module used for calculating a parking fee according to the parking start time and the parking end time; and A deduction module used for automatically deducting, by the sharing platform 6, the parking fee from the account of the parking space demand side 7 and for triggering the intelligent parking space lock to conduct locking.

Referring to FIGS. 1-3, in one embodiment of the invention, the urban private parking space sharing and exchanging service method comprises the following steps:

S1, a parking space supply side 5 scans an identification code of an intelligent parking space lock 8, so that an account of the parking space supply side 5 and an account of a parking space owner stored in the intelligent parking space lock 8 are acquired;

The intelligent parking space lock 8 is installed on a private parking space, and the identification code containing the serial number of the intelligent parking space lock 8, the phone number of the parking space owner and detailed location information of the parking space (including the community address, the longitude and latitude of the parking space, and the number of parking space) is attached to the intelligent parking space lock 8. The parking space owner downwards the parking space supply side 5 via an intelligent device such as a smart phone, a tablet computer or a PC. The intelligent parking space lock 8 communicates with the parking space supply side 5 via Bluetooth or NFC, so that the intelligent parking space lock 8 can be controlled via the intelligent device. When the parking space is vacant, the parking space owner opens the parking space supply side 5 to scan the identification code on the intelligent parking space lock 8 and selects a service role 'parking space owner' after being successfully identified, and then, a sharing platform 6 acquires an account of the current login role and an account of the parking space owner stored in the identification code of the intelligent parking space lock.

S2, if the account of the parking space supply side 5 is identical with the account of the parking space owner stored in the intelligent parking space lock 8, the parking space supply side 5 acquires a permission to set and release parking space sharing information.

The sharing platform 6 compares the account of the current login role with the account of the parking space owner stored in the identification code of the intelligent parking space lock; if the account of the current login role is matched with the account of the parking space owner stored in the identification code of the intelligent parking space lock, the parking space supply side enters a parking space sharing information setting page and obtains the permission to set and release the parking space sharing information.

S3, the parking space supply side 5 sets parking space sharing information and then releases the parking space sharing information on the sharing platform 6, and the intelligent parking space lock 8 is triggered to conduct locking, wherein the parking space sharing information includes the location and sharing period of the parking space.

At this moment, the parking space owner can set the location information and sharing period (including a specific time period value, for instance from 09:00 to 17:00) of the parking space. Or, if the account of the current login role is mismatched with the account of the parking space owner stored in the identification code of the intelligent parking space lock, a corresponding prompt, for instance 'no permission to operate or set the parking space', is given. After being set, the parking space sharing information is released on the sharing platform 6, and the intelligent parking space lock 8 is triggered to automatically conduct locking.

S4, a parking space demand side 7 acquires the parking space sharing information within a preset range, so that a parking space sharing information set is formed.

A parking space demander downloads the parking space demand side 7 via an intelligent device such as a smart phone, a tablet computer or a PC. When the parking space demander has a parking demand, the parking space demand side 7 automatically acquires the location information of the current user, so that information about vacuum parking spaces within a certain range of the current position is provided for the parking space demander.

S5, the parking space demand side 7 selects a parking space corresponding to the parking space sharing information from the parking space sharing information set and sets a time to leave the parking space.

After the parking space demander finds a proper vacant parking space via the parking space supply side 7, the parking space demand side 7 provides navigation for the parking space demander, so that the parking space demander can accurately find the selected vacant parking space.

S51, the parking space demand side 7 scans the identification code of the intelligent parking space lock 8.

After reaching the vacant parking space, the parking space demander scans the identification code on the intelligent parking space lock 8 via the parking space demand side 7, and then the sharing platform 6 identifies an account of the parking space demand side 7.

S52, the parking space demand side 7 acquires a permission to set the time to leave the parking space.

If the account of the parking space demand side is mismatched with an account reserved in the identification code of the intelligent parking space lock, the parking space demander selects a service role 'parking space demander' to enter a parking space service setting page so as to be obtain the permission to set the time to leave the parking space and then sets the time to leave the parking space; or, if the account of the parking space demand side is matched with the account reserved in the identification code of the intelligent parking space lock, the intelligent parking space lock automatically unlocks the parking space to enter into a free-charge parking mode.

S6, if the time set by the parking space demand side 7 to leave the parking space is within the sharing period, the intelligent parking space lock 8 is triggered to conduct unlocking.

The sharing platform 6 determines whether or not the time set by the parking space demand side 7 to leave the parking space is earlier than an end time of the sharing period set by the parking space owner; if yes, the intelligent parking space lock 8 is triggered to conduct unlocking; or, if not, the parking space demander is reminded that the time set to leave is unacceptable.

S7, the account of the parking space demand side 7 is compared with a preset associated account or the account of the parking space supply side 5.

When leaving the parking space, the parking space demander scans the identification code on the intelligent parking space lock via the parking space demand side 7, and then the sharing platform 6 compares the account of the parking space demand side 7 with the preset associated account or the account of the parking space supply side 5.

If the account of the parking space demand side 7 is mismatched with the preset associated account or the account of the parking space supply side 5, a time when the intelligent parking space lock 8 is triggered to conduct unlocking is acquired, so that a parking start time is obtained; a current system time of the sharing platform 6 is acquired, so that a parking end time is obtained; the parking fee is calculated according to the parking start time and the parking end time; the sharing platform 6 automatically deducts the parking fee from the account of the parking space demand side 7, and then the intelligent parking space lock is triggered to conduct locking; or, if the account of the parking space demand side 7 is matched with the preset associated account or the account of the parking space supply side 5, the intelligent parking space lock is triggered to conduct locking.

S8, if a time interval from the time to leave the parking space to the end time of the sharing period is greater than a set minimum time interval, the current system time of the sharing platform 6 is acquired; when the current system time is identical with the time to leave the parking space, the sharing period in the parking space sharing information is updated according to the current system time, so that latest parking space sharing information is obtained; and the latest parking space sharing information is released on the sharing platform 6.

For instance, if the time interval from the time when the parking space demander leaves the parking space to the end time of the sharing period is greater than the minimum time interval (such as one hour) set by the parking space owner, the sharing platform 6 modified the sharing period of the parking space. For instance, the original sharing period of the parking space is from 09:00 to 17:00, the parking space demander leaves the parking space at 12:00, and then the sharing period of the parking space can be modified as 12:01-17:00; and the modified parking space sharing information is released on the sharing platform 6, so that the utilization rate of the vacant parking space is increased.

According to the urban private parking space sharing and exchanging service method and system of the invention, the parking space supply side sets parking space sharing information and then releases the parking space sharing information on the sharing platform, so that the parking space demand side can acquire the parking space sharing information within a preset range from the sharing platform, and therefore, the utilization rate of the vacant parking spaces is increased. In addition, after releasing the parking space sharing information, the parking space supply side triggers the intelligent parking space lock to conduct locking, only if it is determined by the sharing platform that the time set by the parking space demand side to leave the parking space is not later than the end time of the parking space sharing period, the intelligent parking space lock will be triggered to conduct unlocking to allow the parking space demand side to use the parking space, in this way, only qualified parking space demand sides can use vacant parking spaces, so that the vacuum parking spaces are prevented from being abused, and the rights and interests of parking space owners are guaranteed. Furthermore, when the current parking space demand side leaves the parking space, the sharing platform automatically determines the time interval from the current system time to the end time of the sharing period; if the time interval is long, the sharing platform modifies the sharing period of the parking space and then automatically releases the latest sharing information of the parking space, so that the utilization rate of the parking space is further increased. Furthermore, only if the identity of the parking space supply side is verified as valid, the parking space supply side can obtain the permission to set and release relevant sharing information, so that the private parking space is shared completely based on the willingness of the parking space owner, and the rights and interests of the parking space owner are guaranteed. Furthermore, only if the identity of the parking space demand side is identified as valid, the parking space demand side can obtain the permission to set the time to leave the parking space and can have a change to use the parking space, wherein the identity of the parking space demand side is verified in multiple aspects, for instance, whether or not the parking space demand side is a valid user of the sharing platform is verified, and the credibility of the parking space demand side is also verified, so that the rights and interests of the parking space owner are guaranteed. Furthermore, the parking fee is automatically deducted from the account of the parking space demand side, and when the parking space demand side leaves the parking space, the intelligent parking space lock is triggered to conduct locking, so that the parking space is prevented from being abused. In addition, by setting the associated account, the parking space owner and a parking space demand side permitted by the parking space owner are free of charge for the parking fee. Furthermore, communication between the intelligent parking space lock and the parking space supply side as well as communication between the intelligent parking space lock and the parking space demand side are established.

The invention claimed is:

1. An urban private parking space sharing and exchanging service method, comprising:
    setting parking space sharing information and releasing the parking space sharing information on a sharing platform by a parking space supply side, and triggering an intelligent parking space lock to conduct locking, wherein the parking space sharing information includes a location and sharing period of a parking space;
    acquiring the parking space sharing information within a preset range by a parking space demand side, so that a parking space sharing information set is formed;
    selecting a parking space corresponding to the parking space sharing information from the parking space sharing information set and setting a time to leave the parking space, by the parking space demand side; and
    triggering the intelligent parking space lock to conduct unlocking if the time set by the parking space demand side to leave the parking space is within the sharing period;
    wherein the urban private parking space sharing and exchanging service method further comprises:
    if an account of the parking space demand side is mismatched with a preset associated account or an account of the parking space supply side,
    acquiring a time when the intelligent parking space lock is triggered to conduct unlocking, so that a parking start time is obtained;
    acquiring a current system time of the sharing platform, so that a parking end time is obtained;
    obtaining a parking fee by calculation according to the parking start time and the parking end time; and
    automatically deducting, by the sharing platform, the parking fee from the account of the parking space demand side, and triggering to the intelligent parking space lock to conduct locking.

2. The urban private parking space sharing and exchanging service method according to claim 1, wherein the urban private parking space sharing and exchanging service method further comprises:
    if a time interval from the time to leave to the parking space to an end time of the sharing period is greater than a preset minimum time interval,
    acquiring a current system time of the sharing platform;
    updating, when the current system time is identical with the time to leave the parking space, the sharing period in the parking space sharing information according to the current system time, so that latest parking space sharing information is obtained; and
    releasing the latest parking space sharing information on the sharing platform.

3. The urban private parking space sharing and exchanging service method according to claim 1, wherein before the parking space sharing information is set and released on the sharing platform by the parking space supply side, the urban private parking space sharing and exchanging service method further comprises:
    scanning, by the parking space supply side, an identification code of the intelligent parking space lock, so that an account of the parking space supply side and an account of a parking space owner stored in the intelligent parking space lock are acquired; and
    obtaining, by the parking space supply side, a permission to set and release the parking space sharing information if the account of the parking space supply side is identical with the account of the parking space owner stored in the intelligent parking space lock.

4. The urban private parking space sharing and exchanging service method according to claim 1, wherein the urban private parking space sharing and exchanging service method further comprises:
    scanning, by the parking space demand side, an identification code of the intelligent parking space lock; and
    acquiring, by the parking space demand side, a permission to set the time to leave the parking space.

5. The urban private parking space sharing and exchanging service method according to claim 1, wherein the urban private parking space sharing and exchanging service method further comprises:
    establishing communication between the intelligent parking space lock and the parking space supply side as well as communication between the intelligent parking space lock and the parking space demand side via Bluetooth or NFC.

6. An urban private parking space sharing and exchanging service system comprising:
    a first release module used for setting parking space sharing information and releasing the parking space sharing information on a sharing platform by a parking space supply side and for triggering an intelligent parking space lock to conduct locking, wherein the parking space sharing information includes a location and sharing period of a parking space;
    a first acquisition module used for acquiring the parking space sharing information within a preset range by a parking space demand side, so as to form a parking space sharing information set;
    a setting module used for selecting a parking space corresponding to the parking space sharing information from the parking space sharing information set and setting a time to leave the parking space, by the parking space demand side; and a trigger module used for triggering the intelligent parking space lock to conduct unlocking if the time set by the parking space demand side to leave the parking space is within the sharing period;

wherein the urban private parking space sharing and exchanging service system further comprises:

a third acquisition module used for scanning, by the parking space supply side, an identification code of the intelligent parking space lock, so as to acquire an account of the parking space supply side and an account of a parking space owner stored in the intelligent parking space lock;

a fourth acquisition module used for acquiring, by the parking space supply side, a permission to set and release the parking space sharing information if the account of the parking space supply side is identical with the account of the parking space owner stored in the intelligent parking space lock;

a scanning module used for scanning, by the parking space demand side, the identification code of the intelligent parking space lock;

a fifth acquisition module used for acquiring, by the parking space demand side, a permission to set the time to leave the parking space; and a communication module used for establishing communication between the intelligent parking space lock and the parking space supply side as well as communication between the intelligent parking space lock and the parking space demand side via Bluetooth or NFC.

7. The urban private parking space sharing and exchanging service system according to claim 6, wherein the urban private parking space sharing and exchanging service system further comprises:

a first determination module used for determining whether or not a time interval from the time to leave the parking space and an end time of the sharing period is greater than a preset minimum time interval;

a second acquisition module used for acquiring a current system time of the sharing platform;

an updating module used for updating, when the current system time is identical with the time to leave the parking space, the sharing period in the parking space sharing information according to the current system time, so that latest parking space sharing information is obtained; and a second release module used for releasing the latest parking space sharing information on the sharing platform.

8. An urban private parking space sharing and exchanging service system comprising:

a first release module used for setting parking space sharing information and releasing the parking space sharing information on a sharing platform by a parking space supply side and for triggering an intelligent parking space lock to conduct locking, wherein the parking space sharing information includes a location and sharing period of a parking space;

a first acquisition module used for acquiring the parking space sharing information within a preset range by a parking space demand side, so as to form a parking space sharing information set;

a setting module used for selecting a parking space corresponding to the parking space sharing information from the parking space sharing information set and setting a time to leave the parking space, by the parking space demand side; and a trigger module used for triggering the intelligent parking space lock to conduct unlocking if the time set by the parking space demand side to leave the parking space is within the sharing period, wherein the urban private parking space sharing and exchanging service system further comprises:

a second determination module used for determining whether or not an account of the parking space demand side is matched with a preset associated account or an account of the parking space supply side;

a sixth acquisition module used for acquiring a time when the intelligent parking space lock is triggered to conduct unlocking, so as to obtain a parking start time;

a seventh acquisition module used for acquiring a current system time of the sharing platform, so as to obtain a parking end time;

a calculation module used for calculating a parking fee according to the parking start time and the parking end time; and a deduction module used for automatically deducting, by the sharing platform, the parking fee from the account of the parking space demand side and for triggering the intelligent parking space lock to conduct locking.

* * * * *